(12) United States Patent
Sakai

(10) Patent No.: US 9,701,343 B2
(45) Date of Patent: Jul. 11, 2017

(54) VEHICLE FRONT STRUCTURE

(71) Applicant: TOYOTA JIDOSHA KABUSHIKI KAISHA, Toyota-shi, Aichi-ken (JP)

(72) Inventor: Shogo Sakai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/783,016

(22) PCT Filed: Apr. 8, 2013

(86) PCT No.: PCT/JP2013/060641
§ 371 (c)(1),
(2) Date: Oct. 7, 2015

(87) PCT Pub. No.: WO2014/167634
PCT Pub. Date: Oct. 16, 2014

(65) Prior Publication Data
US 2016/0068192 A1 Mar. 10, 2016

(51) Int. Cl.
| | |
|---|---|
| *B60Q 1/00* | (2006.01) |
| *B60Q 1/26* | (2006.01) |
| *B62D 21/15* | (2006.01) |
| *B62D 25/08* | (2006.01) |
| *B62D 25/10* | (2006.01) |
| *B60Q 1/04* | (2006.01) |

(52) U.S. Cl.
CPC ......... *B62D 21/152* (2013.01); *B60Q 1/0483* (2013.01); *B60Q 1/0491* (2013.01); *B62D 25/08* (2013.01); *B62D 25/10* (2013.01)

(58) Field of Classification Search
CPC ............................ B60Q 1/0483; B62D 21/152
USPC .......... 362/487, 459, 475, 507, 486
See application file for complete search history.

(56) References Cited

U.S. PATENT DOCUMENTS

| | | | |
|---|---|---|---|
| 6,190,030 B1 * | 2/2001 | Chase ................. | B60Q 1/0458 362/369 |
| 8,152,345 B2 | 4/2012 | Erlingfors et al. | |
| 2010/0014306 A1 | 1/2010 | Bae | |

(Continued)

FOREIGN PATENT DOCUMENTS

| | | |
|---|---|---|
| DE | 10334033 A1 | 2/2005 |
| JP | 2007-045351 A | 2/2007 |
| JP | 2009-078689 A | 4/2009 |

(Continued)

*Primary Examiner* — Andrew Coughlin
*Assistant Examiner* — Jessica M Apenteng
(74) *Attorney, Agent, or Firm* — Oliff PLC

(57) ABSTRACT

A vehicle front structure that is structured with a headlight covered above that can suppress a collision reaction force in the event of a collision body from above the structure is obtained. A headlight is arranged below a front end portion of a hood. A protrusion portion formed on a lower surface side of the front end portion of a hood inner panel of the hood. The protrusion portion protrudes toward an upper surface side of an upper wall portion of lens of the headlight. A fragile portion is formed in the upper wall portion of the lens of the headlight, in a region opposed to the protrusion portion. Besides, the headlight is fixed to a vehicle body in a manner incapable of being displaced in response to load input from the protrusion portion, and is set so as to fracture due to the load input from the protrusion portion.

5 Claims, 6 Drawing Sheets

(56) References Cited

U.S. PATENT DOCUMENTS

2010/0214801 A1    8/2010   Yonezawa
2013/0088886 A1*   4/2013   Eckert .................. B60Q 1/0416
                                                                      362/528

FOREIGN PATENT DOCUMENTS

JP        2009-208604 A    9/2009
JP        2012-071675 A    4/2012

* cited by examiner

VEHICLE FRONT STRUCTURE

TECHNICAL FIELD

The invention relates to a vehicle front structure.

BACKGROUND ART

A vehicle front portion adopts a structure for enhancing pedestrian protection performance. For example, the following Patent Document 1 discloses a structure in which a headlamp (a headlight) can be displaced in response to the inputting of a collision load from above, a fragile portion is provided in a lower surface of a housing of the headlamp, and a protrusion portion is provided on a front side member below the fragile portion.

RELATED TECHNICAL DOCUMENTS

Patent Documents

Patent Document 1: Japanese Patent Application Publication No. 2007-045351 (JP 2007-045351 A)
Patent Document 2: Japanese Patent Application Publication No. 2009-078689 (JP 2009-078689 A)
Patent Document 3: Japanese Patent Application Publication No. 2009-208604 (JP 2009-208604 A)

SUMMARY OF THE INVENTION

Problem to be Solved by the Invention

However, the foregoing Patent Document 1 does not disclose a structure in which the headlamp is covered above by a front end portion of a hood or the like. There is room for improvement in suppressing a collision reaction force in the case where a collision body collides with the structure from thereabove.

In view of the aforementioned fact, it is an object of the invention to obtain a vehicle front structure that is structured with a headlight covered above and that can suppress a collision reaction force in the event of a collision of a collision body from above the structure.

Means for Solving the Problem

A vehicle front structure according to a first aspect of the invention has a panel portion, a headlight, and a protrusion portion. The panel portion is arranged on an upper surface of a vehicle front portion. The headlight is arranged below a front end portion of the panel portion, and is attached to a vehicle body. The protrusion portion is provided at the front end portion of the panel portion, and protrudes toward an upper surface side of the headlight.

In accordance with the vehicle front structure according to the first aspect of the invention, the panel portion is arranged on the upper surface of the vehicle front portion, and the headlight that is attached to the vehicle body is arranged below the front end portion of this panel portion. In consequence, upon colliding with the front end portion of the panel portion from above the vehicle, a collision body receives a collision reaction force from the headlight side as well via the front end portion of the panel portion, in addition to a collision reaction force from the front end portion side of the panel portion. On the other hand, a protrusion portion that protrudes toward an upper surface side of the headlight is formed at the front end portion of the panel portion. Therefore, when a collision load is input to the front end portion of the panel portion as a result of a collision of the collision body with the front end portion of the panel portion from above the vehicle, the front end portion of the panel portion is displaced downward, so the protrusion portion interferes with the upper surface of the headlight. Thus, the load concentrates on a region of the headlight with which the protrusion portion interferes. Then, when the headlight is broken, collision energy is absorbed, and the collision reaction force that is input to the collision body from the headlight side is suppressed. Besides, the front end portion of the panel portion can be displaced further downward due to suppression of the collision reaction force from the headlight side.

A vehicle front structure according to a second aspect of the invention is obtained by modifying the vehicle front structure according to the first aspect of the invention such that the headlight is fixed to the vehicle body in a manner incapable of being displaced in response to a load input from the protrusion portion, and is set so as to fracture due to the load input from the protrusion portion.

In accordance with the vehicle front structure according to the second aspect of the invention, when a load is input to the headlight from the protrusion portion as a result of a collision of the collision body with the front end portion of the panel portion, the headlight fractures without being displaced downward. Thus, it is possible to avoid a phenomenon in which an inertial force that is generated when a resting state of the headlight relative to the vehicle body changes due to the collision is input to the collision body. Besides, even if the headlight locally deforms immediately before the headlight fractures, the time during which the collision body receives the collision reaction force from the headlight side is reduced. Furthermore, as a result of fracture of the headlight, no collision reaction force is input to the collision body from the headlight side, and a space that allows the front end portion of the panel portion to be displaced is formed.

A vehicle front structure according to a third aspect of the invention is obtained by modifying the vehicle front structure according to the first or second aspect of the invention such that a fragile portion that is more fragile against a load from above a vehicle than other regions of an upper portion of the headlight is formed in a region of the headlight that is opposed to the protrusion portion.

In accordance with the vehicle front structure according to the third aspect of the invention, the fragile portion is formed in the region of the headlight that is opposed to the protrusion portion. Therefore, when a collision load is input to the front end portion of the panel portion from above the vehicle, the protrusion portion interferes with the fragile portion. Therefore, the headlight is more stably broken with the fragile portion serving as a starting point.

A vehicle front structure according to a fourth aspect of the invention is obtained by modifying the vehicle front structure according to the third aspect of the invention such that the headlight is equipped with a housing through which an opening portion that opens forward with respect to the vehicle is formed, and a lens that covers the opening portion of the housing and that has an upper wall portion arranged below the front end portion of the panel portion, and that the fragile portion is formed in the upper wall portion of the lens.

In accordance with the vehicle front structure according to the fourth aspect of the invention, the opening portion that opens forward with respect to the vehicle is formed through the housing of the headlight. The lens of the headlight covers the opening portion of the housing, and has the upper wall portion arranged below the front end portion of the panel portion. Then, the fragile portion is formed in the upper wall portion of the lens of the headlight, so the lens stably fractures with the fragile portion serving as a cracking starting point. Then, even if the lens locally deforms immediately before fracturing, the time during which the collision body receives a collision reaction force from the lens side is reduced. Besides, as a result of fracture of the lens, no collision reaction force is input to the collision body from the lens side, and a space that allows the front end portion of the panel portion to be displaced is formed.

A vehicle front structure according to a fifth aspect of the invention is obtained by modifying the vehicle front structure according to any one of the first to fourth aspects of the invention such that a plurality of the protrusion portions are provided in parallel with one another in a direction along a parting portion between the panel portion and the headlight.

In accordance with the vehicle front structure according to the fifth aspect of the invention, the plurality of the protrusion portions that are formed on the panel portion are provided in parallel with one another in the direction along the parting portion between the panel portion and the headlight. Therefore, in the case where the collision body collides with the front end portion of the panel portion above the headlight, even when the position of collision of the collision body is dispersed, a concentrated load is input to the upper surface of the headlight by one of the protrusion portions.

Effects of the Invention

As described above, the vehicle front structure according to the first aspect of the invention has an excellent effect that the collision reaction force can be suppressed when the collision body collides with the structure in which the headlight is covered above, from above the structure.

The vehicle front structure according to the second aspect of the invention has an excellent effect that the collision reaction force received by the collision body can be effectively suppressed as a whole by effectively suppressing the collision reaction force that is input to the collision body from the headlight side.

The vehicle front structure according to the third aspect of the invention has an excellent effect that the headlight can be stably broken when the collision body collides from above.

The vehicle front structure according to the fourth aspect of the invention has an excellent effect that the lens of the headlight can be stably fractured when the collision body collides from above, and that a space that allows the front end portion of the panel portion to be displaced downward can be formed.

The vehicle front structure according to the fifth aspect of the invention has an excellent effect that the headlight can be stably broken even when the position of collision of the collision body with the front end portion of the panel portion covering the headlight is dispersed.

MODES FOR CARRYING OUT THE INVENTION

First Embodiment

A vehicle front structure according to the first embodiment of the invention will be described using FIGS. 1 to 4C. Incidentally, arrows FR, UP, and IN are suitably shown in these drawings. The arrow FR indicates a front side with respect to a vehicle. The arrow UP indicates an upper side with respect to the vehicle. The arrow IN indicates an inner side in a vehicle width direction.

Figure 1:
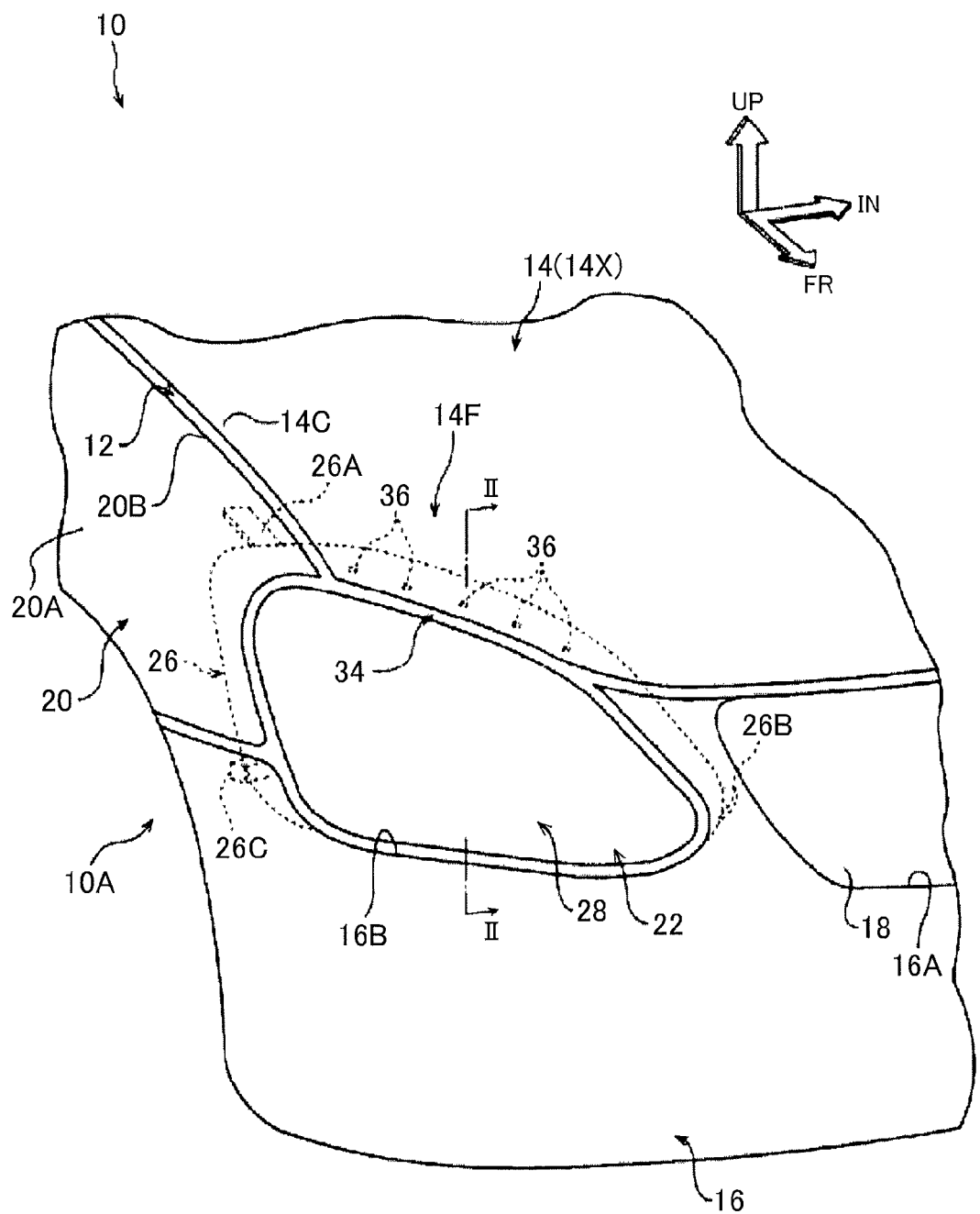
FIG. 1 is a perspective view showing a vehicle front structure according to a first embodiment of the invention as viewed diagonally from in front of and outside a vehicle.
Figure 2:
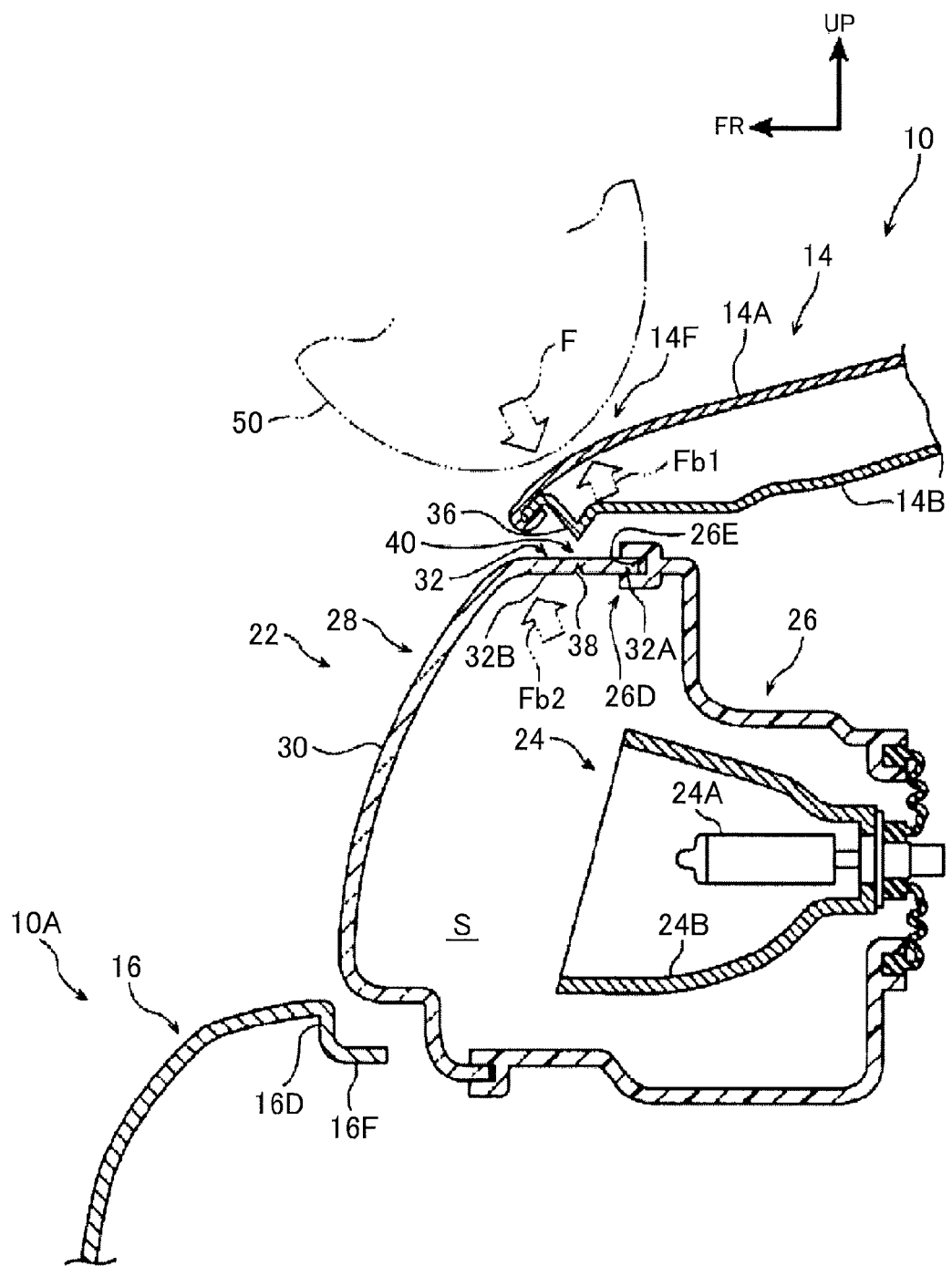
FIG. 2 is an enlarged cross-sectional view taken along a line 2-2 in FIG. 1.

FIG. 1 is a perspective view showing a headlight 22 of a vehicle front portion 10 and a peripheral portion thereof as viewed diagonally from in front of and outside the vehicle. Besides, FIG. 2 is an enlarged cross-sectional view taken along a line 2-2 in FIG. 1.

The vehicle front portion 10 is provided with an opening portion 12 of an engine room. The opening portion 12 of the engine room is covered in an openable/closable manner by a hood (which is also referred to as "a bonnet") 14 as a panel portion. As shown in FIG. 2, the hood 14 is equipped with a hood outer panel 14A as a hood outer plate, and a hood inner panel 14B as a hood inner plate. The hood outer panel 14A and the hood inner panel 14B are linked with each other at peripheral edge portions thereof through hemming or the like. Thus, the hood outer panel 14A of the hood 14 and the hood inner panel 14B of the hood 14 form a closed cross-section. The hood 14 is a hollow plate body that is flat in a vehicle vertical direction.

The hood 14 shown in FIG. 1 is attached, at both end portions thereof in the vehicle width direction on a vehicle rear end side thereof, to an apron upper member (not shown) via a hood hinge (not shown). Then, the hood 14 rotationally moves around an axis of the hood hinge that extends along the vehicle width direction, thereby opening/closing the opening portion 12 of the engine room. That is, the hood 14 can rotationally move between an open position (not shown) where the opening portion 12 of the engine room is open, and a closed-down position 14X (see FIG. 1) where the opening portion 12 of the engine room is closed down and arranged on an upper surface of the vehicle front portion 10.

Incidentally, a striker (not shown) is attached to a lower surface of a central portion of a front end portion 14F of the hood 14 in the vehicle width direction. In a state where the hood 14 is at the closed-down position 14X, the striker is locked by a lock mechanism (not shown) that is attached to a radiator support upper (not shown). Besides, the opening portion 12 of the engine room is provided with a hood stopper (not shown) that is made of synthetic rubber or the like. Having moved from the open position to the closed-down position 14X, the hood 14 comes into abutment on the hood stopper. A front bumper cover 16, a radiator grill 18, and the headlight 22 are arranged below the front end portion 14F of the hood 14.

The front bumper cover 16 is provided at a front end portion of the vehicle front portion 10 to constitute a design surface, and is arranged in a belt-like manner along the vehicle width direction as a whole. A notch portion 16A that is notched in such a manner as to be bored concavely from above the vehicle is formed in a central area of the front bumper cover 16 in the vehicle width direction. The radiator grill 18 is disposed above the notch portion 16A. The radiator grill 18 is engaged with the front bumper cover 16, and is equipped with an air intake hole (not shown). The front bumper cover 16 is gently bent, at both end portions thereof in the vehicle width direction, backward with respect to the vehicle. Besides, as shown in FIG. 2, the front bumper cover 16 is equipped with an inner wall portion 16D that is flexed and drooped from an upper end portion thereof. A lower end portion of the inner wall portion 16D is a flange portion 16F that is extended toward the engine room side.

As shown in FIG. 1, front fender panels 20 are adjacent to both end portions of the front bumper cover 16 in a longitudinal direction thereof, respectively. These front fender panels 20 are arranged on both sides of the vehicle front portion 10 respectively. Each of these fender panels 20 is equipped with an outer wall portion 20A that constitutes a lateral surface of the vehicle front portion 10, and has an upper end side curved inward in the vehicle width direction. Besides, an upper end portion 20B of each of the front fender panels 20 is adjacent to an end portion 14C of the hood 14 in the vehicle width direction. Each of the front fender panels 20 is equipped with an inner wall portion (not shown) that is flexed and drooped from the upper end portion 20B. A lower end portion of the inner wall portion is a flange portion (not shown) that is extended inward in the vehicle width direction. Then, the flange portion of each of the front fender panels 20 is attached to the apron upper member (not shown).

Besides, notch portions 16B that are notched in such a manner as to be bored concavely from above the vehicle are formed in both end portions of the front bumper cover 16 in the longitudinal direction thereof. The headlight 22 (which is an element grasped as "a vehicular lighting fixture" in a broad sense) is arranged adjacent to these notch portions 16B thereabove. The headlight 22 is designed to emit light toward a space in front of the vehicle. As shown in FIG. 2, the headlight 22 is a heavy object that is arranged below the front end portion 14F of the hood 14 and that is configured to include a light source unit 24, a housing 26, and a lens 28.

The light source unit 24 is equipped with a light source 24A (e.g., a discharge bulb, an LED, or the like). Also, the light source unit 24 is equipped with a concave mirror-like reflector 24B with a view to reflecting diffuse light from the light source 24A and directing this diffuse light in a certain direction (forward with respect to the vehicle). This light source unit 24 is accommodated inside the housing 26, and is supported by the housing 26 (not shown in detail).

As shown in FIG. 1, a first attachment portion 26A that extends substantially backward with respect to the vehicle is provided at an upper portion of the housing 26 that is located outside in the vehicle width direction. The first attachment portion 26A is fastened to the flange portion (not shown) of each of the front fender panels 20 by a bolt, so the headlight 22 is fixed to each of the front fender panels 20. Besides, a second attachment portion 26B that extends substantially backward with respect to the vehicle is provided close to a lower portion of the housing 26 that is located inside in the vehicle width direction. The second attachment portion 26B is fastened to a lateral portion (not shown) of the radiator grill 18 behind the front bumper cover 16 by a bolt, so the headlight 22 is fixed to the radiator grill 18. Furthermore, a third attachment portion 26C that extends substantially outward in the vehicle width direction from a rear portion side of the housing 26 is provided close to a lower portion of the housing 26 that is located outside in the vehicle width direction. The third attachment portion 26C is fastened to the flange portion 16F (see FIG. 2) of the front bumper cover 16 by a bolt, so the headlight 22 is fixed to the front bumper cover 16. As a result of the foregoing, the headlight 22 is attached to a vehicle body 10A.

Besides, as shown in FIG. 2, an opening portion 26D that opens forward with respect to the vehicle is formed through the housing 26 of the headlight 22. A lens attachment portion 26E is formed in the opening portion 26D of this housing 26. The lens attachment portion 26E is formed in the shape of a groove that is open forward with respect to the vehicle.

The lens 28 is disposed in front of the housing 26 with respect to the vehicle. The lens 28 is formed of a transparent hard material (e.g., a resin material such as polycarbonate (PC) or the like), and is constituted by a material that is more fragile against a collision load than the housing 26. The lens 28 is equipped with a lens body 30 that constitutes a design surface, and a leg portion 32 that is extended substantially backward with respect to the vehicle from an outer peripheral end portion of the lens body 30. A distal end portion 32A of the leg portion 32 is arranged inside the groove of the lens attachment portion 26E of the housing 26, and is attached to the lens attachment portion 26E of the housing 26 with an O-ring-like sealing member (not shown) interposed therebetween. Thus, the opening portion 26D of the housing 26 is covered by the lens 28. Besides, an upper wall portion 32B as part of the leg portion 32 of the lens 28 is arranged below the front end portion 14F of the hood 14. A lighting chamber S is formed inside the housing 26 and the lens 28. Incidentally, although not shown, various mechanisms that are arranged in the lighting chamber S are supported by the housing 26.

On the other hand, protrusion portions 36 are formed on a lower surface side of the front end portion 14F of the hood inner panel 14B of the hood 14. The protrusion portions 36 protrude toward the upper surface side of the upper wall portion 32B of the lens 28 of the headlight 22, and are formed in the shape of a circular cone whose apex is a single point. Besides, the positions of protrusion distal ends of the protrusion portions 36 are set such that the protrusion portions 36 do not interfere with the upper wall portion 32B of the headlight 22 both in the case where the hood 14 is violently closed and in the case where the hood 14 is closed from a high position. As shown in FIG. 1, a plurality of (e.g., five in the present embodiment of the invention) the protrusion portions 36 are provided in parallel with one another in a direction along a parting portion 34 between the hood 14 and the headlight 22.

Figure 3:
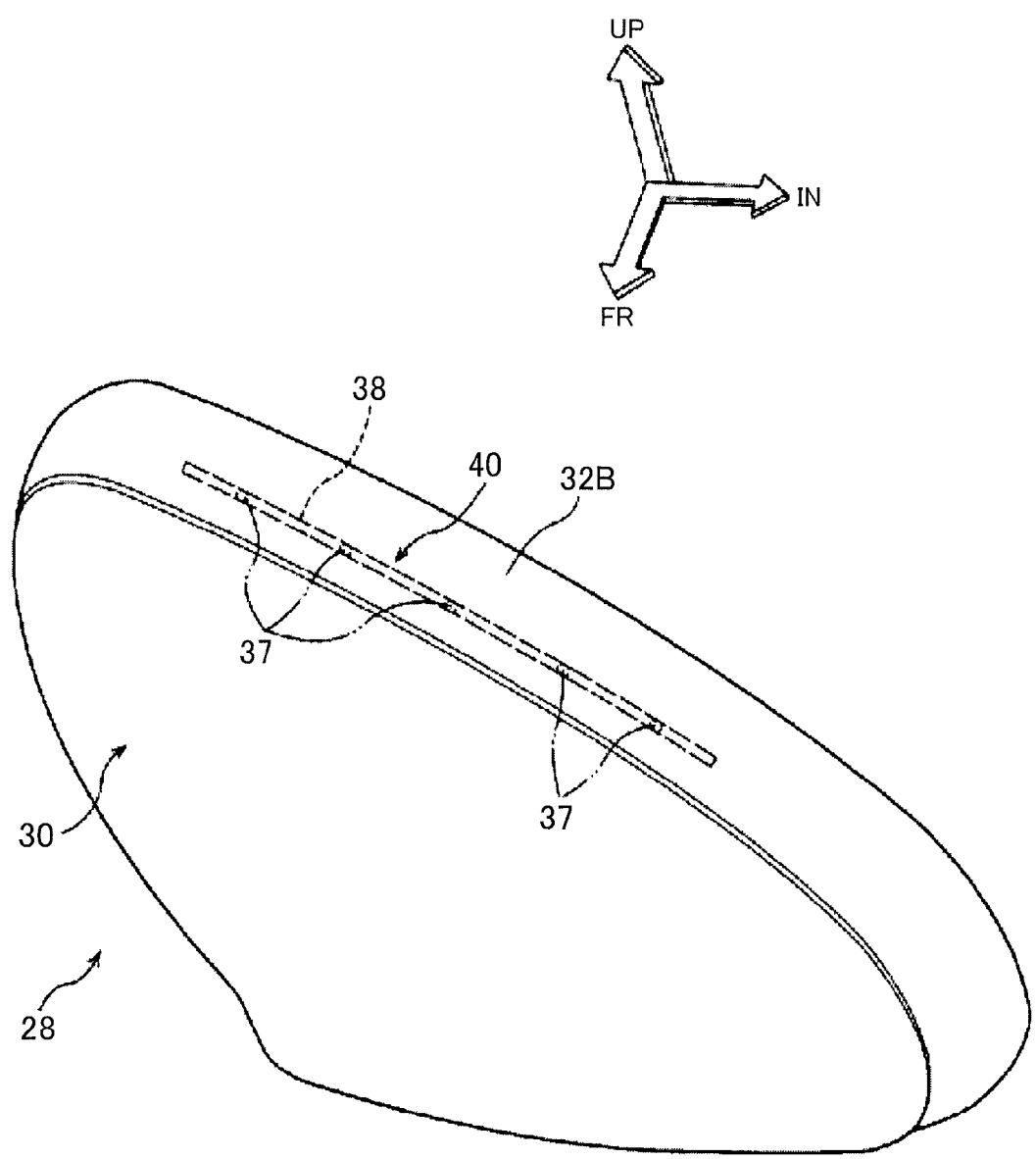
FIG. 3 is a perspective view showing a lens as a single body of a headlight of FIG. 1 as viewed diagonally from above.

In contrast, as shown in FIG. 2, a notch 38 that is notched in the shape of V is formed in the lower surface side of the upper wall portion 32B of the lens 28 of the headlight 22. This notch 38 is set in an intermediate portion of the upper wall portion 32B in the vehicle longitudinal direction. A portion of the upper wall portion 32B in which the notch 38 is formed is a fragile portion 40. FIG. 3 is a perspective view showing the lens 28 as a single body as viewed diagonally from above. As shown in FIG. 3, the fragile portion 40 extends along a boundary portion between the lens body 30 and the upper wall portion 32B, and joins together all opposed regions 37 that are opposed to the protrusion portions 36 (see FIG. 1). The fragile portion 40 shown in FIG. 2 is more fragile against a load from above the vehicle than the other regions of the upper portion of the headlight 22, and is set so as to serve as a cracking starting point (trigger) in response to the load from above the vehicle. That is, the headlight 22 is configured such that the cracking of the headlight 22 is promoted from the fragile portion 40 when the protrusion portions 36 interfere with the headlight 22. Besides, the notch 38 is formed in the lower surface side of the upper wall portion 32B, so the upper wall portion 32B deforms substantially in the shape of V immediately after the interference of the protrusion portions 36 with the upper surface of the upper wall portion 32B.

Besides, the headlight 22 shown in FIG. 1 is fixed to the vehicle body 10A (concretely, the front fender panels 20, the radiator grill 18, and the front bumper cover 16 that have been described previously) in a manner incapable of being displaced in response to a load input from the protrusion portions 36, and is set so as to fracture due to the load input from the protrusion portions 36.

(Operation and Effect)

Next, the operation and effect of the aforementioned embodiment of the invention will be described.

Figure 4A:
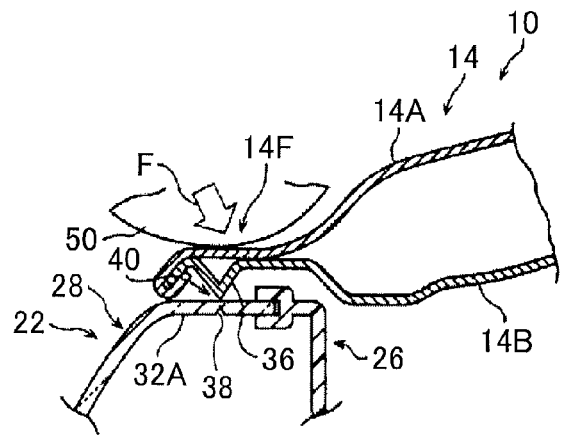
FIG. 4A is a lateral cross-sectional view showing a state where a protrusion portion of a hood abuts on a fragile portion of the headlight as a result of a collision of a collision body with a front end portion of the hood from above the vehicle.

When a head impactor 50 as a collision body shown in FIG. 2 collides with the front end portion 14F of the hood 14 from above the vehicle, a collision load F is input to the front end portion 14F of the hood 14. In this case, as shown in FIG. 4A, the front end portion 14F of the hood 14 deforms downward while the hood outer panel 14A approaches the hood inner panel 14B. At this time, collision energy is absorbed.

Besides, as shown in FIG. 2, the headlight 22 is arranged below the front end portion 14F of the hood inner panel 14B of the hood 14. Therefore, when the front end portion 14F of the hood 14 deforms downward, the front end portion 14F of the hood 14 comes into abutment on the headlight 22. That is, the head impactor 50 receives a collision reaction force Fb2 from the headlight 22 side as well via the front end portion 14F of the hood 14, in addition to a collision reaction force Fb1 from the front end portion 14F side of the hood 14.

It should be noted herein that the protrusion portions 36 that protrude toward the upper surface side of the headlight 22 are formed on the lower surface side of the front end portion 14F of the hood 14 in the present embodiment of the invention. Therefore, when the collision load F is input to the front end portion 14F of the hood 14, the protrusion portions 36 interfere with the upper surface of the headlight 22 as a result of downward deformation of the front end portion 14F of the hood 14, as shown in FIG. 4A.

Figure 4B:
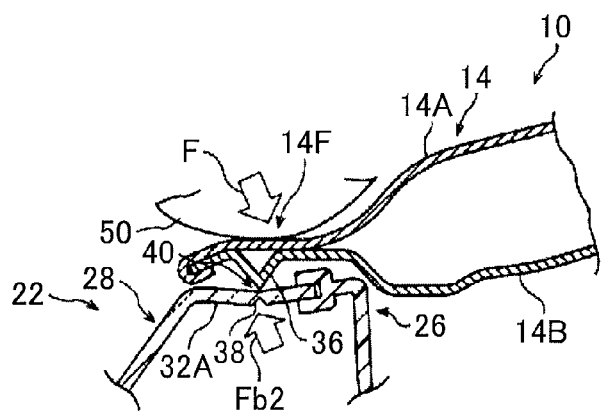
FIG. 4B is a lateral cross-sectional view showing a state where the headlight has deformed from the fragile portion after the state of FIG. 4A.
Figure 4C:
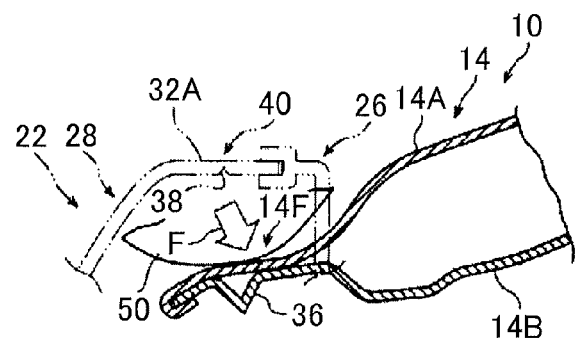
FIG. 4C is a lateral cross-sectional view showing a state where the headlight has cracked and the front end portion of the hood has been displaced further downward after the state of FIG. 4B.

Thus, the load (a stress) concentrates on the region of the headlight 22 with which the protrusion portions 36 interfere. Then, as shown in FIGS. 4B and 4C, when the headlight 22 deforms to be broken as shown in FIGS. 4B and 4C, collision energy is absorbed, and the collision reaction force Fb2 that is input to the head impactor 50 from the headlight 22 side is suppressed. In other words, the pedestrian protection performance at the front end portion 14F of the hood 14 is enhanced. Incidentally, in FIG. 4C, the initial position of the headlight 22 is indicated by an alternate long and two short dashes line.

Besides, in the present embodiment of the invention, as shown in FIG. 2, the fragile portion 40 is formed in the opposed regions that are opposed to the protrusion portions 36 of the headlight 22. Accordingly, when the collision load F is input to the front end portion 14F of the hood 14 from above the vehicle, the protrusion portions 36 interfere with the fragile portion 40 as shown in FIG. 4A. As a result, as shown in FIG. 4B, the headlight 22 fractures after having stably and locally deformed with the fragile portion 40 serving as a starting point.

To explain in more details, in the present embodiment of the invention, the fragile portion 40 shown in FIG. 2 is formed in the upper wall portion 32B of the lens 28 of the headlight 22. In consequence, the lens 28 of the headlight 22 stably fractures with the fragile portion 40 serving as a cracking starting point. Then, as shown in FIG. 4B, even when the lens 28 locally deforms immediately before fracturing, the time during which the head impactor 50 receives the collision reaction force Fb2 from the headlight 22 side is reduced. Besides, as shown in FIG. 4C, due to fracture of the lens 28, no collision reaction force is input to the head impactor 50 from the lens 28 side, and a space that allows the front end portion 14F of the hood 14 to be displaced is formed. As a result, a stroke enabling the front end portion 14F of the hood 14 to deform is secured.

A supplementary explanation will now be given while making a comparison with a first contrast structure. For example, in the first contrast structure in which neither the protrusion portions 36 nor the fragile portion 40 (the notch 38) of the present embodiment of the invention is formed and only a lower surface of a front end portion of a hood is arranged opposed to an upper surface of a headlight, when the front end portion of the hood interferes with the upper surface of the headlight, this interference is interference in a surface contact state. Therefore, the load applied to the upper surface of the headlight is scattered. Then, when the rigidity of the headlight is high, the collision reaction force that is input to the head impactor until the headlight breaks is larger than in the case of the present embodiment of the invention. Incidentally, the rigidity of the lens of the headlight is set high when durability and commerciality (e.g., the basic performance of commercial goods such as the incapability of deforming through a mere touch by users, and the like) are taken into account. In consequence, when the first contrast structure is applied, the collision reaction force from the headlight side to the head impactor may increase.

In contrast, according to the present embodiment of the invention, the protrusion portions 36 input the local load to the headlight 22 to break the headlight 22. Thus, the collision reaction force from the headlight 22 side to the head impactor 50 can be suppressed.

Besides, in the present embodiment of the invention, as shown in FIGS. 4A to 4C, when the collision load F is input to the headlight 22 from the protrusion portions 36 as a result of a collision of the head impactor 50 with the front end portion 14F of the hood 14, the headlight 22 fractures without being displaced downward. Thus, it is possible to avoid a phenomenon in which the inertial force that is generated when the resting state of the headlight 22 relative to the vehicle body 10A (see FIG. 1) changes due to a collision is input to the head impactor 50. Besides, as shown in FIG. 4C, the front end portion 14F of the hood 14 deforms further downward as a result of the elimination of the collision reaction force that is input from the headlight 22 side. Thus, collision energy is absorbed.

A supplementary explanation will now be given while making a comparison with a second contrast structure. The second contrast structure is a structure in which a front end portion of a hood is arranged above a headlight, the headlight is attached to a vehicle body side in a manner displaceable downward in response to a load input from the front end portion of the hood, a fragile portion is formed in a bottom wall portion of a housing of the headlight, and a vehicle body skeleton member is provided with protrusion portions directly below the fragile portion. In this second contrast structure, when a head impactor collides with the front end portion of the hood from above a vehicle, the headlight is moved relatively to the vehicle body after the front end portion of the hood interferes with the headlight. Then, if the headlight is a heavy object as in the case of the present embodiment of the invention, the collision reaction force that is input to the head impactor from the headlight side increases.

In contrast, according to the present embodiment of the invention, the headlight 22 is fractured without being moved relatively to the vehicle body 10A (see FIG. 1). Therefore, the collision reaction force that is input to the head impactor 50 from the headlight 22 side is suppressed. Incidentally, in the present embodiment of the invention, the collision load F displaces the front end portion 14F of the hood 14 further downward after fracture of the headlight 22, so the collision reaction force is input to the head impactor 50 from the front end portion 14F side of the hood 14. In general, however, the rigidity of the front end portion 14F of the hood 14 with which the head impactor 50 collides is much lower than the rigidity of the headlight. In general, the weight of the front end portion 14F of the hood 14 is much lighter than the weight of the headlight. Therefore, the collision reaction force that is input to the head impactor 50 from the front end portion 14F side of the hood 14 in the present embodiment of the invention is smaller than the collision reaction force that is input to the head impactor from the headlight side in the second contrast structure. In consequence, the collision reaction force received by the head impactor 50 is suppressed as a whole.

Besides, in the present embodiment of the invention, as shown in FIG. 1, the plurality of the protrusion portions 36 that are formed on the hood 14 are provided in parallel with one another in the direction along the parting portion 34 between the hood 14 and the headlight 22. Therefore, in the case where the head impactor 50 (see FIG. 2) collides with the front end portion 14F of the hood 14 that covers the headlight 22, even when the position of collision of the head impactor 50 is dispersed, a concentrated load is input to the upper surface of the headlight 22 by one of the protrusion portions 36. In consequence, even when the position of collision is dispersed, the headlight 22 can be stably broken.

As described above, the vehicle front structure according to the present embodiment of the invention makes it possible to suppress a collision reaction force in the case where the head impactor 50 collides with a structure in which the headlight 22 is covered above, from above the structure.

Second Embodiment

Figure 5:
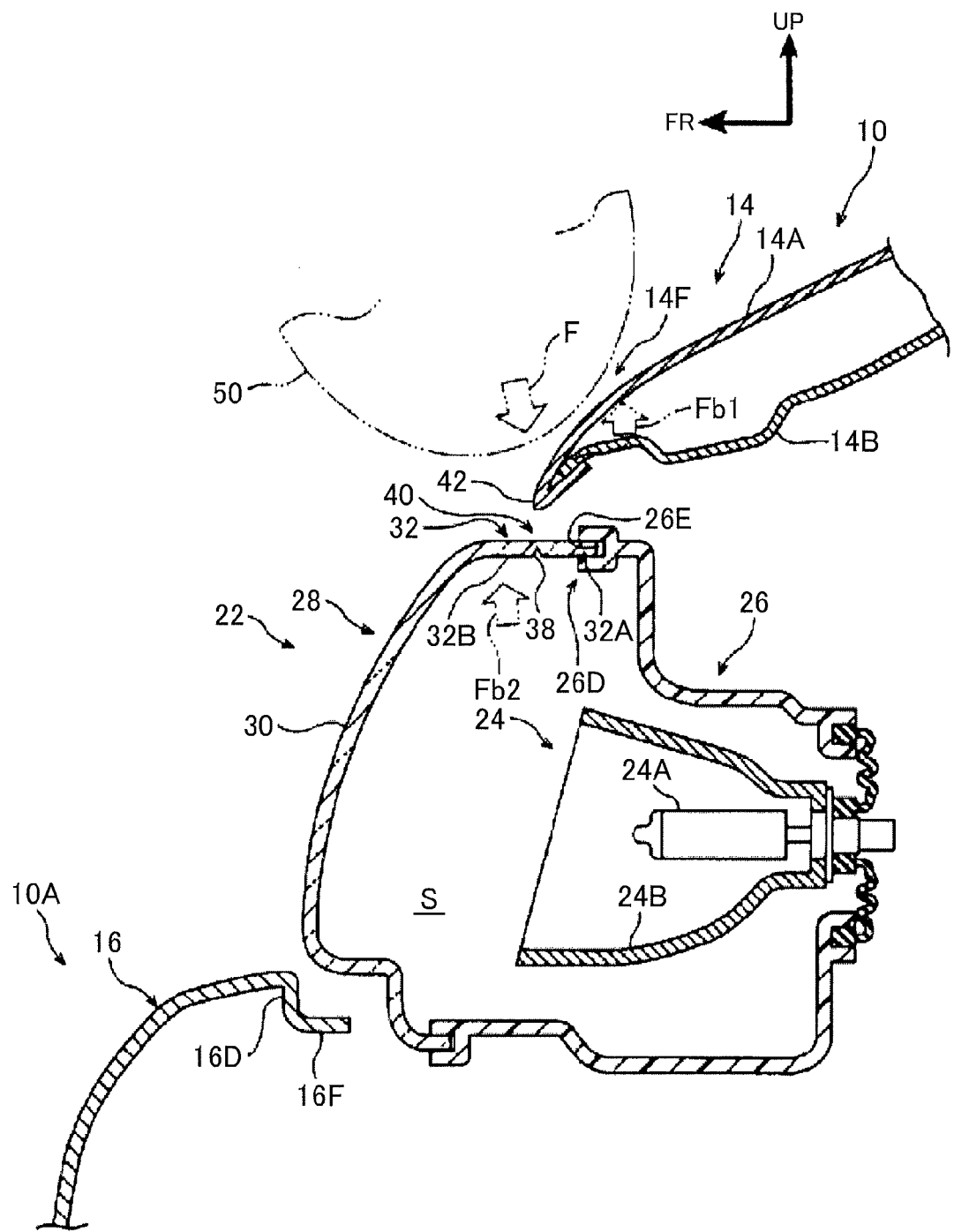
FIG. 5 is a lateral cross-sectional view showing a vehicle front structure according to a second embodiment of the invention.

Next, a vehicle front structure according to the second embodiment of the invention will be described using FIG. 5. FIG. 5 is a lateral cross-sectional view showing the vehicle front structure according to the second embodiment of the invention (a view corresponding to FIG. 2 of the first embodiment of the invention). As shown in this drawing, the present embodiment of the invention is different from the first embodiment of the invention in that a terminal of the front end portion 14F of the hood 14 is employed as a protrusion portion 42 instead of each of the protrusion portions 36 (see FIG. 2). The second embodiment of the invention is identical in other configurational details to the first embodiment of the invention. In consequence, components identical to those of the first embodiment of the invention are denoted by the same reference symbols respectively, and the description thereof will be omitted.

As shown in FIG. 5, the protrusion portion 42 is formed at the terminal of the front end portion 14F of the hood 14, and protrudes toward the upper surface side of the headlight 22. That is, the protrusion portion 42 constitutes part of a peripheral edge portion of the hood 14, and is so formed as to protrude from a closed cross-section portion of the front end portion 14F of the hood 14. Besides, the fragile portion 40 of the headlight 22 is formed in a region opposed to the protrusion portion 42.

According to the aforementioned configuration, when the collision load F is input to the front end portion 14F of the hood 14 as a result of a collision of the head impactor 50 with the front end portion 14F of the hood 14 from above the vehicle, the front end portion 14F of the hood 14 is displaced downward, so the protrusion portion 42 interferes with the fragile portion 40 on the upper surface of the headlight 22. Owing to the aforementioned configuration as well, an operation and an effect that are similar to those of the foregoing first embodiment of the invention are obtained.

Third Embodiment

Figure 6:
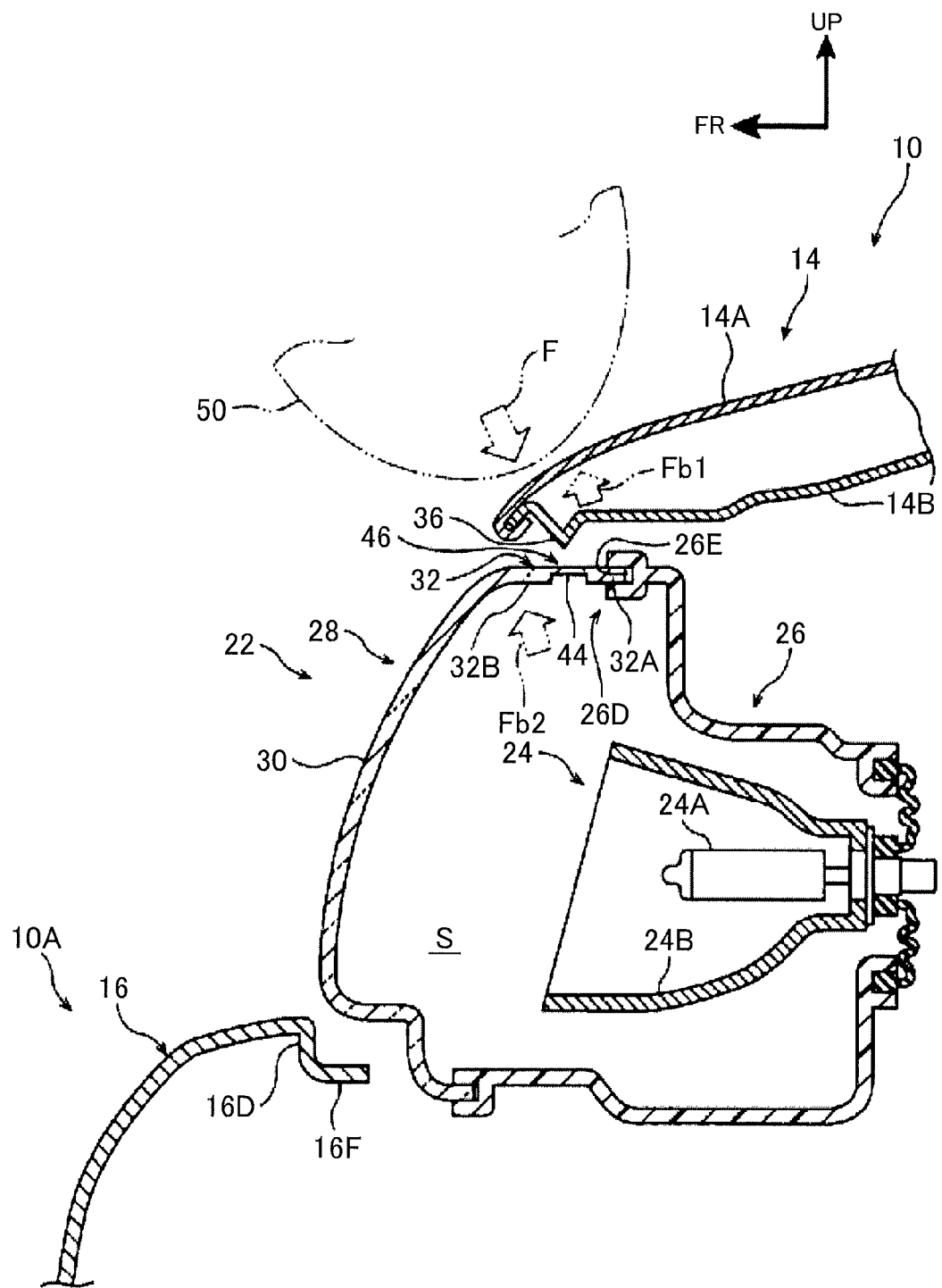
FIG. 6 is a lateral cross-sectional view showing a vehicle front structure according to a third embodiment of the invention.

Next, a vehicle front structure according to the third embodiment of the invention will be described using FIG. 6. FIG. 6 is a lateral cross-sectional view showing the vehicle front structure according to the third embodiment of the invention (a view corresponding to FIG. 2 of the first embodiment of the invention). As shown in this drawing, the present embodiment of the invention is different from the first embodiment of the invention in that a thin plate portion 46 is provided as a fragile portion instead of the fragile portion 40 (see FIG. 2). The third embodiment of the invention is identical in other configurational details to the first embodiment of the invention. In consequence, components identical to those of the first embodiment of the invention are denoted by the same reference symbols respectively, and the description thereof will be omitted.

As shown in FIG. 6, a concave groove portion 44 that is concaved upward with respect to the vehicle is formed in the lower surface side of the upper wall portion 32B of the lens 28 of the headlight 22. This concave groove portion 44 is set at an intermediate portion of the upper wall portion 32B in the vehicle longitudinal direction. The portion of the upper wall portion 32B in which the concave groove portion 44 is formed is the thin plate portion 46 that is smaller in board thickness than other regions. The thin plate portion 46 is formed in the regions opposed to the protrusion portions 36, is more fragile against a load from above the vehicle than the other regions of the upper portion of the headlight 22, and is set so as to serve as a cracking starting point (trigger) in response to the load from above the vehicle. As is the case with the notch 38 (see FIG. 3) in the first embodiment of the invention, the concave groove portion 44 extends along the boundary portion between the lens body 30 and the upper wall portion 32B, and joins together all the regions that are opposed to the protrusion portions 36. Besides, the concave groove portion 44 is formed in the lower surface side of the upper wall portion 32B, so the upper wall portion 32B deforms substantially in the shape of V immediately after interference of the protrusion portions 36 with the upper surface of the upper wall portion 32B.

According to the aforementioned configuration, when the collision load F is input to the front end portion 14F of the hood 14 as a result of a collision of the head impactor 50 with the front end portion 14F of the hood 14 from above the vehicle, the front end portion 14F of the hood 14 is displaced downward, so the protrusion portions 36 interfere with the thin plate portion 46 on the upper surface of the headlight 22. Owing to the aforementioned configuration as well, an operation and an effect that are similar to those of the foregoing first embodiment of the invention are obtained.

Supplementary Explanation of Embodiment

Incidentally, as a modification example of the aforementioned embodiment of the invention, the panel portion that is arranged on the upper surface of the vehicle front portion and that has the protrusion portions protruding toward the upper surface side of the headlight may be, for example, another panel portion such as an upper end portion of a front fender panel or the like. For example, when the position, in the vehicle width direction, of the parting (the boundary) between the upper end portion 20B of each of the front fender panels 20 shown in FIG. 1 and the end portion 14C of the hood 14 that is located outside in the vehicle width direction is set more inward in the vehicle width direction than the position shown in FIG. 1, the protrusion portions may be formed on the lower surface sides of the upper end portion and the front end portion of the front fender panel.

Besides, the protrusion portions that are formed at the front end portion of the panel portion and that protrude toward the upper surface side of the headlight may be formed integrally with the front end portion of the panel portion (the front end portion 14F of the hood 14) as is the case with the aforementioned embodiment of the invention. Alternatively, protrusion-like members that are formed separately from the panel portion may be coupled to the lower surface of the front end portion of the panel portion. In other words, the concept of "provided at the front end portion of the panel portion" in the first aspect of the invention includes not only the integral formation with the front end portion of the panel portion as is the case with the aforementioned embodiment of the invention, but also the coupling of the protrusion-like members that are formed separately from the panel portion to the lower surface of the front end portion of the panel portion. Besides, the number of a plurality of protrusion portions that are provided in parallel with one another in the direction along the partition portion between the panel portion and the headlight is not limited to the example of the aforementioned embodiment of the invention. Furthermore, as another modification example, only a single protrusion portion may be formed instead of the plurality of the protrusion portions.

Besides, as a modification example of the aforementioned embodiment of the invention, the headlight may be fixed to another vehicle body constituting member such as a radiator supporter upper, a front bumper reinforcement, or the like. Besides, as another modification example, the headlight may be attached to the vehicle body in a manner capable of being displaced to a certain extent in response to a load input from the protrusion portions, and may be set so as to fracture due to the load input from the protrusion portions.

Besides, as a modification example of the aforementioned first and second embodiments of the invention, the fragile portion that is set in the regions opposed to the protrusion portions (36, 42) may be set through the formation of a notch in the upper surface side of the upper wall portion (32B) of the lens (28) of the headlight (22). Besides, as a modification example of the aforementioned third embodiment of the invention, the thin plate portion as the fragile portion that is set in the regions that are opposed to the protrusion portions (36) may be formed with a smaller board thickness than the other regions, through the formation of the concave groove portion in the upper surface side of the upper wall portion (32B) of the lens (28) of the headlight (22).

Besides, as a modification example of the aforementioned embodiments of the invention, the fragile portion (40) and the thin plate portion (46) may be set only in the regions opposed to the protrusion portions (36) without extending along the boundary portion between the lens body (30) and the upper wall portion (32B). Furthermore, as a modification example of the aforementioned embodiment of the invention, it is also possible to adopt a configuration in which no fragile portion is formed in the regions opposed to the protrusion portions of the headlight.

Besides, as a modification example of the aforementioned embodiments of the invention, the fragile portion that is formed in the regions opposed to the protrusion portions may be formed in the upper wall portion of the housing instead of being formed in the upper wall portion of the lens of the headlight. For example, in the case where the length of the upper wall portion (32B) of the lens (28) shown in FIG. 2 and the like in the vehicle longitudinal direction is short, and the upper wall portion of the housing (26) is set behind the upper wall portion (32B) of the lens (28) with respect to the vehicle, or the like, the fragile portion may be formed in the upper wall portion of the housing (26).

Incidentally, the expression "fixed to the vehicle body in a manner incapable of being displaced" in the second aspect of the invention includes not only a case of being fixed to the vehicle body in a manner incapable of being displaced in a strict sense, but also a case where the headlight 22 as a whole is fixed to the vehicle body in a manner incapable of being displaced although the portion of the headlight 22 that interferes with the protrusion portions 36 and the peripheral portion thereof locally and instantaneously deform as is the case with the aforementioned embodiment of the invention.

The aforementioned embodiments of the invention and the above-mentioned plurality of the modification examples can be carried out in appropriate combinations.

Although the examples of the invention have been described above, the invention should not be limited to the foregoing. In addition to the foregoing, the invention can be obviously carried out after being modified in various manners within such a range as not to depart from the gist thereof.

What is claimed is:
1. A vehicle front structure comprising:
   a panel portion being arranged on an upper surface of a vehicle front portion;
   a headlight being arranged below a front end portion of the panel portion and being attached to a vehicle body; and
   a protrusion portion being provided at the front end portion of the panel portion, spaced away from the headlight and protruding toward an upper surface side of the headlight, wherein the headlight is fixed to the vehicle body such that a portion of the headlight opposed to the protrusion portion is not displaced in response to a load input from an impact load.

2. The vehicle front structure according to claim 1, wherein
the headlight is fixed to the vehicle body in a manner incapable of being displaced in response to a load input from the protrusion portion, and is set so as to fracture due to the load input from the protrusion portion.

3. The vehicle front structure according to claim 1, wherein
a fragile portion is formed in a region of the headlight, the region being opposed to the protrusion portion, the fragile portion being more fragile against a load from above a vehicle than other regions of an upper portion of the headlight.

4. The vehicle front structure according to claim 3, wherein
the headlight is equipped with a housing comprising an opening portion and a lens,
the opening portion opens forward with respect to the vehicle is formed, and
the lens covers the opening portion of the housing and has an upper wall portion arranged below the front end portion of the panel portion, and
the fragile portion is formed in the upper wall portion of the lens.

5. The vehicle front structure according to claim 1, wherein
a plurality of the protrusion portions are provided in parallel with one another in a direction along a parting portion between the panel portion and the headlight.

* * * * *